United States Patent
Hori et al.

(10) Patent No.: US 7,551,538 B2
(45) Date of Patent: Jun. 23, 2009

(54) OPTICAL RECORDING APPARATUS AND OPTICAL HEAD

(75) Inventors: Shigeki Hori, Oogaki (JP); Kevin Curtis, Longmont, CO (US); Aaron Wegner, Longmont, CO (US)

(73) Assignees: Sanyo Electric Co., Ltd., Osaka (JP); Inphase Technologies, Longmont, CO (US)

( * ) Notice: Subject to any disclaimer, the term of this patent is extended or adjusted under 35 U.S.C. 154(b) by 603 days.

(21) Appl. No.: 11/256,085

(22) Filed: Oct. 24, 2005

(65) Prior Publication Data

US 2007/0091768 A1     Apr. 26, 2007

(51) Int. Cl.
  *G11B 7/00*     (2006.01)
(52) U.S. Cl. ...................................... 369/103
(58) Field of Classification Search ........................ None
  See application file for complete search history.

(56) References Cited

U.S. PATENT DOCUMENTS

| | | | | |
|---|---|---|---|---|
| 4,498,740 | A * | 2/1985 | Caulfield | 359/9 |
| 6,961,161 | B2 * | 11/2005 | Tsukagoshi et al. | 359/10 |
| 2002/0015376 | A1 * | 2/2002 | Liu et al. | 369/103 |
| 2005/0083799 | A1 * | 4/2005 | Horimai | 369/44.28 |

FOREIGN PATENT DOCUMENTS

| | | |
|---|---|---|
| JP | 10-124872 | 5/1998 |
| JP | 11-016374 | 1/1999 |
| JP | 11-133843 | 5/1999 |
| JP | 2000-338846 A | 12/2000 |

* cited by examiner

*Primary Examiner*—Wayne R Young
*Assistant Examiner*—Lixi Chow
(74) *Attorney, Agent, or Firm*—McDermott Will & Emery LLP

(57) ABSTRACT

To provide an optical recording apparatus capable of effectively suppressing useless fixation to an information-unrecorded area during a fixing process with a simple structure, and an optical head. Upon recording information, a movable lens of an expander lens 104 is positioned in an information recording position. In an information fixing process, the movable lens of the expander lens 104 is positioned in a fixing-process position. In this case, a range of irradiation to the recording medium with the data light becomes somewhat wider than that in the information recording process. Accordingly, it is possible to fix the information to an area irradiated with the data light in the information recording process without fail. In addition, the irradiation range is only somewhat wider than that in the information fixing process, making it possible to minimize the region uselessly subjected to the fixing process.

15 Claims, 11 Drawing Sheets

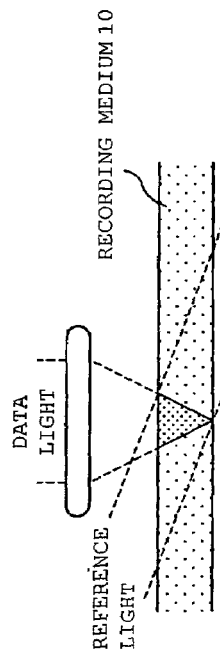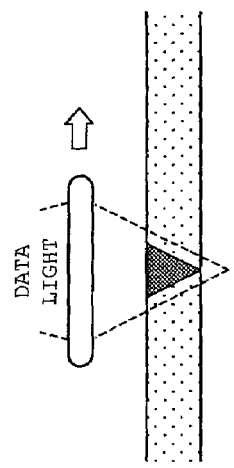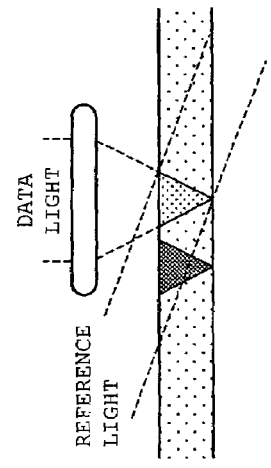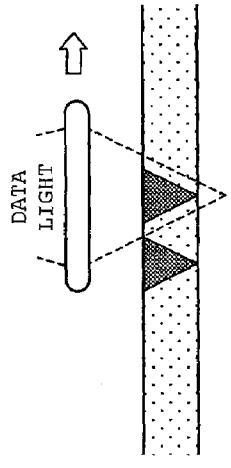
FIG. 5A  RECORDING (MULTI-ANGLE)
FIG. 5B  FIXING PROCESS
FIG. 5C  AREA MOVING & RECORDING
FIG. 5D  FIXING PROCESS

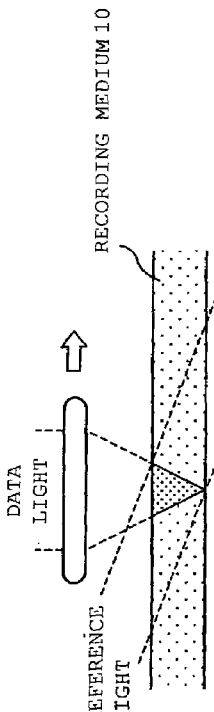
FIG. 7A  RECORDING (FOR ONE PAGE)
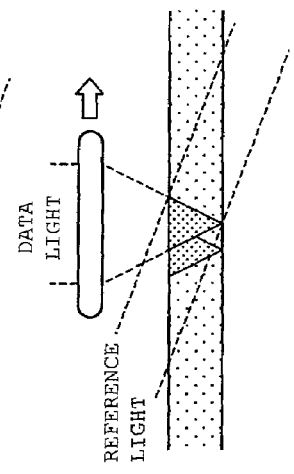
FIG. 7B  AREA MOVING & RECORDING
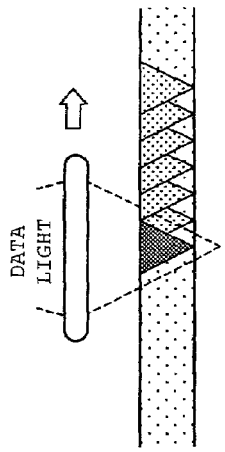
FIG. 7C  RETURNING TO INITIAL POSITION & DATA LIGHT IRRADIATION
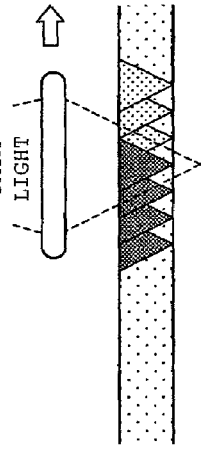
FIG. 7D  SUCCESSIVE MOVEMENT OF DATA LIGHT (FIXATION)

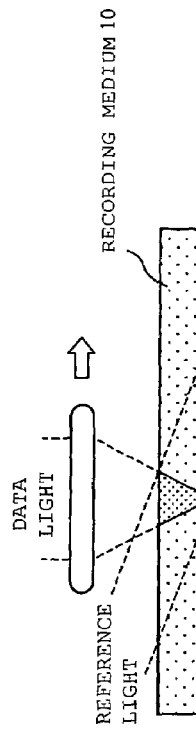
FIG. 10A  RECORDING (FOR ONE PAGE)
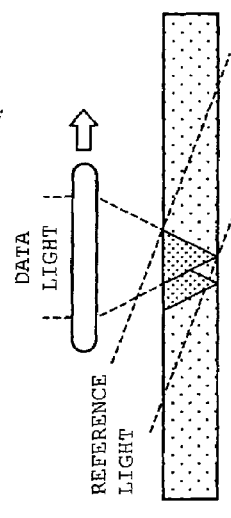
FIG. 10B  AREA MOVING & RECORDING
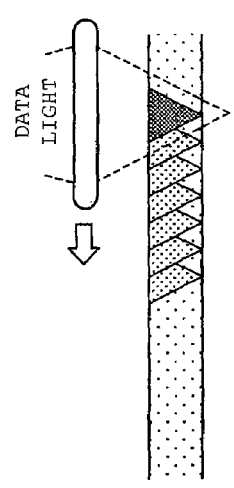
FIG. 10C  DATA LIGHT IRRADIATION
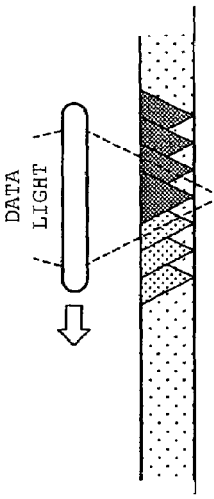
FIG. 10D  SUCCESSIVE MOVEMENT OF DATA LIGHT (FIXATION)

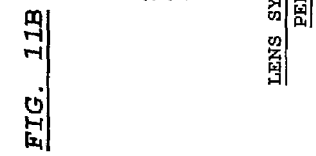

FIG. 11B

LENS SYSTEM IS OSCILLATED IN DIRECTION PERPENDICULAR TO OPTICAL AXIS

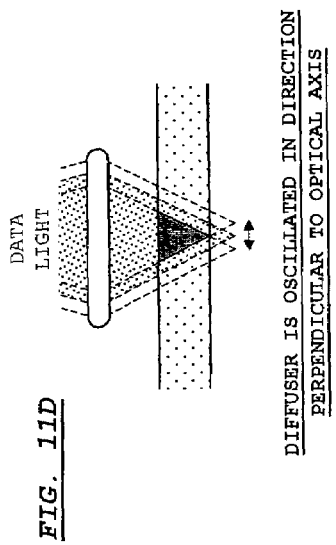

FIG. 11D

DIFFUSER IS OSCILLATED IN DIRECTION PERPENDICULAR TO OPTICAL AXIS

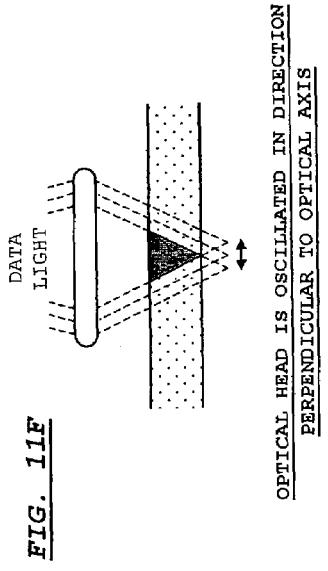

FIG. 11F

OPTICAL HEAD IS OSCILLATED IN DIRECTION PERPENDICULAR TO OPTICAL AXIS

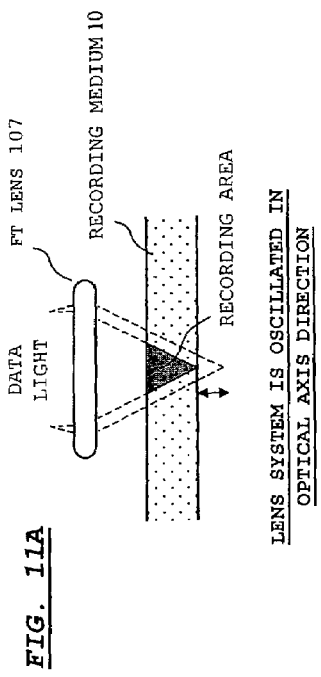

FIG. 11A

LENS SYSTEM IS OSCILLATED IN OPTICAL AXIS DIRECTION

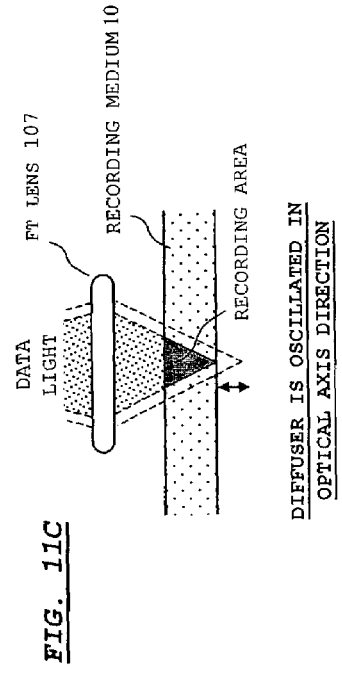

FIG. 11C

DIFFUSER IS OSCILLATED IN OPTICAL AXIS DIRECTION

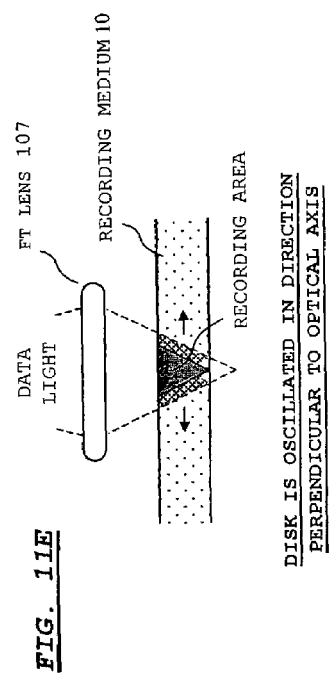

FIG. 11E

DISK IS OSCILLATED IN DIRECTION PERPENDICULAR TO OPTICAL AXIS

OPTICAL RECORDING APPARATUS AND OPTICAL HEAD

BACKGROUND OF THE INVENTION

1. Field of the Invention

The present invention relates to an optical recording apparatus for recording information by causing data light and reference light to interfere with each other inside a hologram material layer, and an optical head used therefor.

2. Description of the Related Art

In recent years, a recording medium based on holography has been under study as a novel recording medium. Such a recording medium aims at recording information by fixing, to a hologram material layer, interference fringes caused when the data light interferes with the reference light therein. Upon recording the information, the data light is subjected to spatial light modulation in accordance with information to be recorded. When the recording medium is irradiated with the data light along with the reference light, interference fringes corresponding to the information to be recorded are formed in the hologram material layer. Highly photopolymerizable monomers (with a high refractive index) are concentrated in a "bright" region in the interference fringes. Then, fixing light applied to the hologram material layer turns the highly photopolymerizable monomers concentrated in the "bright" region into polymers, and a refractive index profile is marked in conformity with the interference fringes in the hologram material layer. Information is thus recorded on the recording medium.

As known in the art regarding the above recording medium, an incident angle of the reference light to the hologram material layer is changed, information corresponding to plural pages can be multiply recorded in one recording area (multi-angle recording). That is, the data light undergoes spatial light modulation each time the incident angle of the reference light is changed for different kinds of information, whereby interference fringes each corresponding to a different piece of information to be recorded are separately fixed in the same recording area for each incident angle.

The reference light is applied to the hologram material layer with the same angle as that for information recording upon reproduction. Thus, the reference light involves coherent light corresponding to the interference fringes formed with the above angle. A light receiving element receives the thus-produced light, allowing reproduction of the recorded information with the above angle.

Note that JP 10-124872 A (Patent Document 1), JP 11-16374 A (Patent Document 2) and JP 2000-338846 A (Patent Document 3) describe an optical recording apparatus based on multi-angle recording.

In addition, JP 11-133843 A (Patent Document 4) discloses an optical recording apparatus where a special light source for applying fixing light is additionally provided aside from a light source for applying data light and reference light.

However, in the case of additionally providing the light source dedicated to the use for fixation as in Patent Document 4 above, another optical system for guiding the light from the light source to a recording medium should be provided in addition to the light source. This causes a problem in that the structure of the optical system is complicated, and the overall size of an apparatus is enlarged. In this case, also required is means for accurately applying the light from the special light source to an information-recorded area as a target of fixation. Besides, it is necessary to separately provide means for controlling positions of the recording medium and the fixing light during the relative movement therebetween.

To overcome the above problem, a method using reference light as the fixing light may be adopted. This method requires no additional light source for fixation, and is free from the above problem.

However, in this case, when entering the hologram material layer at an angle to the optical axis of the data light, the reference light undesirably reaches an information-unrecorded area other than the information-recorded area, which brings about a problem in that fixation is uselessly effected even on the information-unrecorded area exposed to the reference light. Further, a larger portion of the information-unrecorded area is exposed to the reference light when the reference light is allowed to enter the hologram material layer while changing its incident angle so as to completely fix the information over the information-recorded area without fail. As a result, the fixation is uselessly effected on the larger portion of the information-unrecorded area.

SUMMARY OF THE INVENTION

The present invention, which has been made to solve the above-described problems, has an object to provide an optical recording apparatus capable of effectively suppressing useless fixation to an information-unrecorded area during a fixing process with a simple structure, and an optical head.

According to the present invention, data light is used as fixing light.

In a fixing process, a range of irradiation to a hologram material layer with the data light becomes somewhat wider than that in a recording process owing to an optical element such as an expander lens. Therefore, the data light is applied throughout an information-recorded area to thereby firmly fix the information to the information-recorded area.

In the present invention as well, the range of irradiation to the hologram material layer with the data light becomes somewhat wider than that in a recording process, so an information-unrecorded area other than the information-recorded area is subjected to a fixing process with data light. However, compared to the above case where the reference light enters at an angle to the optical axis of the data light, the information-unrecorded area is exposed to the data light during the fixing process within an extremely narrow range. Consequently, according to the present invention, it is possible to minimize the information-unrecorded area uselessly wasted in the fixing process.

Further, according to the present invention, any special light source for a fixing process is unnecessary, whereby problems of complicated optical system and enlarged apparatus main body can be avoided. Besides, the number of components and cost can be kept from increasing.

The invention as described in claim 1 relates to an optical recording apparatus for recording information by causing data light and reference light to interfere with each other inside a hologram material layer, characterized by including: an optical element for changing a range of irradiation to the hologram material layer with the data light; a driving unit for driving the optical element; a control unit for controlling the driving unit such that the range of irradiation to the hologram material layer with the data light is wider in fixing the information than the range in recording the information; and means for suspending the irradiation to the hologram material layer with the reference light during the fixing of the information.

According to the invention as described in claim 2, the optical recording apparatus as described in claim 1 is characterized in that the optical element includes an expander lens that is driven by the driving unit to change a diffusion state of the data light.

According to the invention as described in claim 3, the optical recording apparatus as described in claim 1 is characterized in that the optical element includes a diffuser that is driven by the driving unit to change a diffusion state of the data light and a coherent state.

According to the invention as described in claim 4, the optical recording apparatus as described in any one of claims 1 to 3 is characterized in that the control unit controls the driving unit such that the range of irradiation to the hologram material layer with the data light is switched from the range in recording the information to the range in fixing the information upon completion of information recording for one recording area.

According to the invention as described in claim 5, the optical recording apparatus as described in any one of claims 1 to 3 is characterized in that the control unit controls the driving unit such that the range of irradiation to the hologram material layer with the data light is switched from the range in recording the information to the range in fixing the information along with shift in irradiation position of the data light to a recording area where information recording starts out of a plurality of recording areas that have been subjected to the information recording in succession.

According to the invention as described in claim 6, the optical recording apparatus as described in claim 5 is characterized in that the data light is applied with the range of irradiation to the hologram material layer being set to the range in fixing the information while successively shifting its irradiation position from the recording area where the information recording starts toward a recording area where the information recording ends.

According to the invention as described in claim 7, the optical recording apparatus as described in any one of claims 1 to 3 is characterized in that the control unit controls the driving unit such that the range of irradiation to the hologram material layer with the data light is switched from the range in recording the information to the range in fixing the information upon completion of information recording for a recording area where information recording ends out of a plurality of recording areas that have been subjected to the information recording in succession.

According to the invention as described in claim 8, the optical recording apparatus as described in claim 7 is characterized in that the data light is applied with the range of irradiation to the hologram material layer being set to the range in fixing the information while successively shifting its irradiation position from the recording area where the information recording ends toward a recording area where the information recording starts.

According to the invention as described in claim 9, the optical recording apparatus as described in any one of claims 1 to 3 is characterized by further including means for temporally changing the coherent state of the data light in the hologram material layer in fixing the information.

According to the invention as described in claim 10, the optical recording apparatus as described in claim 9 is characterized in that the means for temporally changing the coherent state of the data light includes means for repeatedly displacing the data light in a direction of an optical axis of the data light or a direction perpendicular to the optical axis in fixing the information.

According to the invention as described in claim 11, the optical recording apparatus as described in claim 9 is characterized in that the means for temporally changing the coherent state of the data light includes means for periodically changing a drive current of a semiconductor laser for emitting the laser beam in fixing the information.

According to the invention as described in claim 12, the optical recording apparatus as described in claim 9 is characterized in that the means for temporally changing the coherent state of the data light includes means for periodically changing a temperature of a semiconductor laser for emitting the laser beam in fixing the information.

The invention as described in claim 13 relates to an optical head for irradiating a hologram material layer with data light and reference light to record information, characterized by including: an optical element inserted in an optical path for the data light and adapted to change a range of irradiation to the hologram material layer with the data light; and a driving unit for driving the optical element.

According to the invention as described in claim 14, the optical head as described in claim 13 is characterized in that the optical element includes an expander lens that is driven by the driving unit to change a diffusion state of the data light.

According to the invention as described in claim 15, the optical head as described in claim 13 is characterized in that the optical element includes a diffuser that is driven by the driving unit to change a diffusion state of the data light and a coherent state.

According to the present invention, it is possible to provide the optical recording apparatus capable of effectively suppressing useless fixation to the information-unrecorded area during the fixing process with a simple structure as set forth above.

Here, as described in claim 2 or 10, when the optical element is composed of an expander lens, the optical element and driving unit can be down sized and simplified. Besides, the control in the fixing process can be facilitated.

Further, as described in claim 3 or 15, when the optical element is composed of a diffuser, the fixing process can be carried out using spatially incoherent light. Accordingly, light interference caused by internal reflection in a recording medium or incidence of ambient light to the hologram material layer can be suppressed, making it possible to smoothly and properly effect the fixing process.

Note that as described in claim 4, the fixing process can be performed each time information recording for one recording area is completed. In this case, it is unnecessary to perform positional adjustment of data light to the recording area in the information fixing process, enabling simple control in the same process. That is, in the information fixing process, a range of irradiation to the hologram material layer with the data light needs only to be widened from the range during the information recording process by driving the optical element. Note that the invention as described in claim 4 is preferably used especially for information recording based on multi-angle recording.

Further, as described in claim 5 or 8, the fixing process can be performed following the successive information recording for plural recording areas. In this case, the information recording process and fixing process are successively performed on the plural recording areas, making it possible to improve the process speed as compared to the case of fixing information for each recording process. In particular, as described in claim 6 or 7, when the data light is shifted in reverse order from the last recorded area to the first recorded area during the information fixing process, the process can be swiftly shifted to the information fixing process that starts from the last recording area. This makes it possible to maximize the effect of accelerating the process. Note that the invention as described in claim 5 or 8 is preferably used especially for information recording based on multi-angle recording.

Further, as described in claim 9 or 12, when temporally changing the coherent state of the data light in the hologram material layer in fixing the information, even if light interference is caused by internal reflection or the like in the recording medium, its interference state can be changed over time. Therefore, fixation of an unnecessary pattern (noise) on the hologram material layer by the interference can be suppressed, whereby an appropriate fixing process can be achieved.

BRIEF DESCRIPTION OF THE DRAWINGS

The above-mentioned and other objects of the present invention and the novel features thereof will be more completely clear when the following description of the embodiment is read with reference to the accompanying drawings, in which:

FIGS. 5A to 5D are views schematically showing a flow upon recording information and upon fixing information according to Embodiment 1 of the present invention;

FIGS. 7A to 7D are views schematically showing a flow upon recording information and upon fixing information according to Embodiment 2 of the present invention;

FIGS. 10A to 10D are views schematically showing a flow upon recording information and upon fixing information according to Embodiment 4 of the present invention; and FIGS. 11A to 11F are views schematically showing an irradiation state of a data light in fixing information according to Embodiment 5 of the present invention.

It is to be expressly understood, however, that the drawings are for purpose of illustration only and is not intended as a definition of the limits of invention.

DETAILED DESCRIPTION OF THE PREFERRED EMBODIMENT

Hereinafter, an embodiment of the present invention will be described with reference to the accompanying drawings. Note that the following embodiment is only an example and thus not intended to limit the scope of the present invention in any way.

[Embodiment 1]

Figure 1:
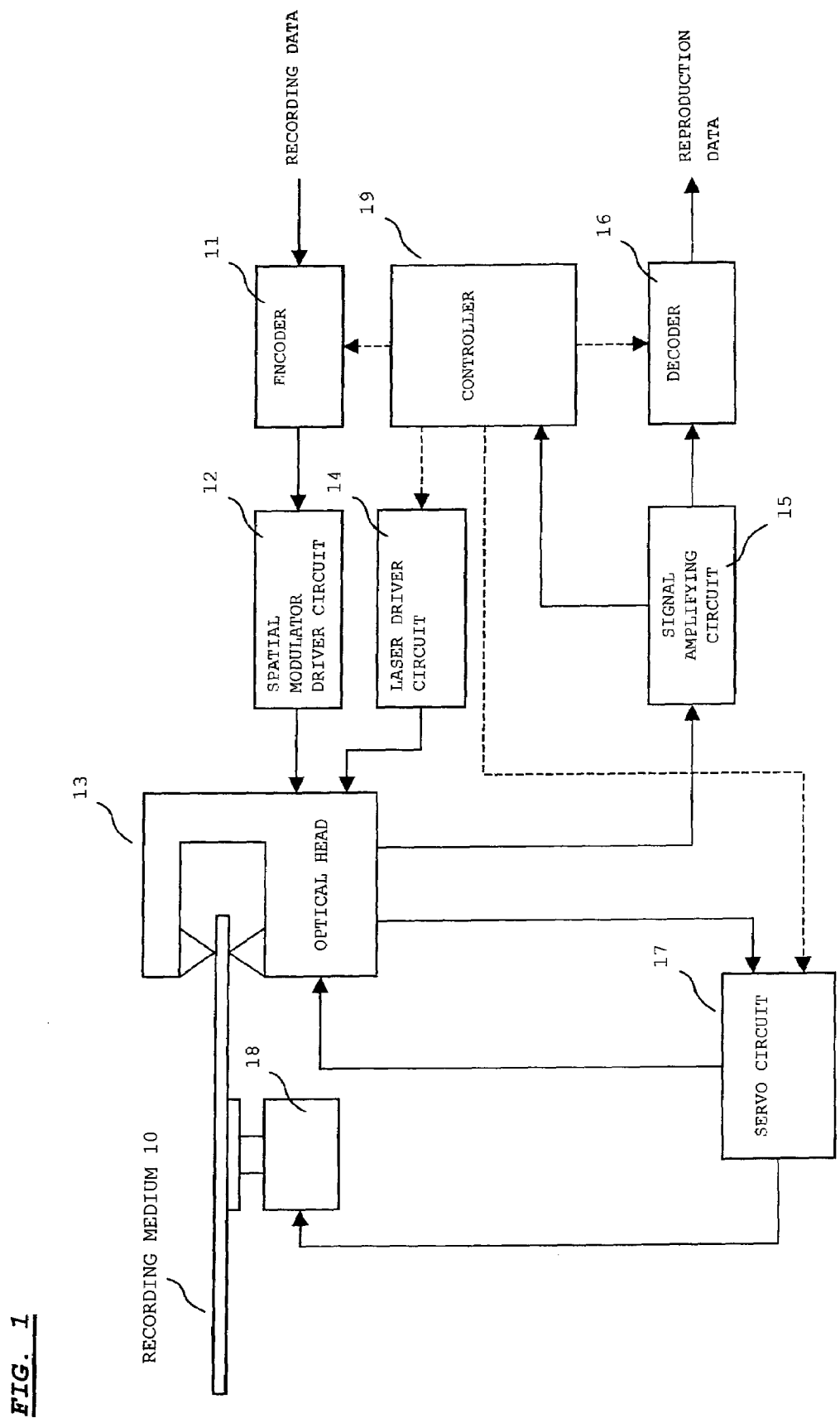
FIG. 1 is a diagram showing a construction of an optical recording apparatus according to Embodiment 1 of the present invention.

FIG. 1 shows a construction example of an optical recording apparatus according to this embodiment. The optical recording apparatus shown in FIG. 1 is used for recording/reproducing information on/from a transmission recording medium.

The optical recording apparatus includes an encoder 11, a spatial modulator driver circuit 12, an optical head 13, a laser driver circuit 14, a signal amplifier circuit 15, a decoder 16, a servo circuit 17, a stepping motor 18, and a controller 19.

The encoder 11 encodes recording data and sends the data to the spatial modulator driver circuit 12. The spatial modulator driver circuit 12 generates a recording signal for driving a spatial optical modulator (described below) in the optical head from the encoded recording data, and drives the spatial optical modulator in the optical head 13 according to the generated recording signal. The optical head 13 irradiates a recording medium (disk) 10 with data light and reference light. The optical head 13 is supported movably in a radius direction of the recording medium 10 by a feed driving mechanism (not shown).

The laser driver circuit 14 drives a semiconductor laser (described below) in the optical head 13 according to a control command from the controller 19. The signal amplifier circuit 15 amplifies an electric signal (reproduction signal) output from an image pickup element (described below) in the optical head 13, and sends this signal to the decoder 16 and the controller 19. The decoder 16 decodes the reproduction signal input from the signal amplifier circuit 15 to produce reproduction data, and outputs this data to a subsequent circuit.

The servo circuit 17 generates a servo signal for feeding the recording medium 10 stepwise in its circumferential direction according to a control command from the controller 19, and outputs this signal to the stepping motor 18. Also, the servo circuit generates a servo signal for feeding the optical head 13 stepwise in the radius direction of the recording medium 10 according to a control command from the controller 19, and outputs this signal to the feed mechanism. Further, the servo circuit drives each component in the optical head 13 and controls processes for recording, fixing, and reproducing information according to a control command from the controller 19.

The stepping motor 18 feeds the recording medium 10 stepwise in its circumferential direction according to the servo signal from the servo circuit 17. The controller 19 outputs the control command to each circuit when the processes for recording, fixing, and reproducing information are performed.

Figure 2:
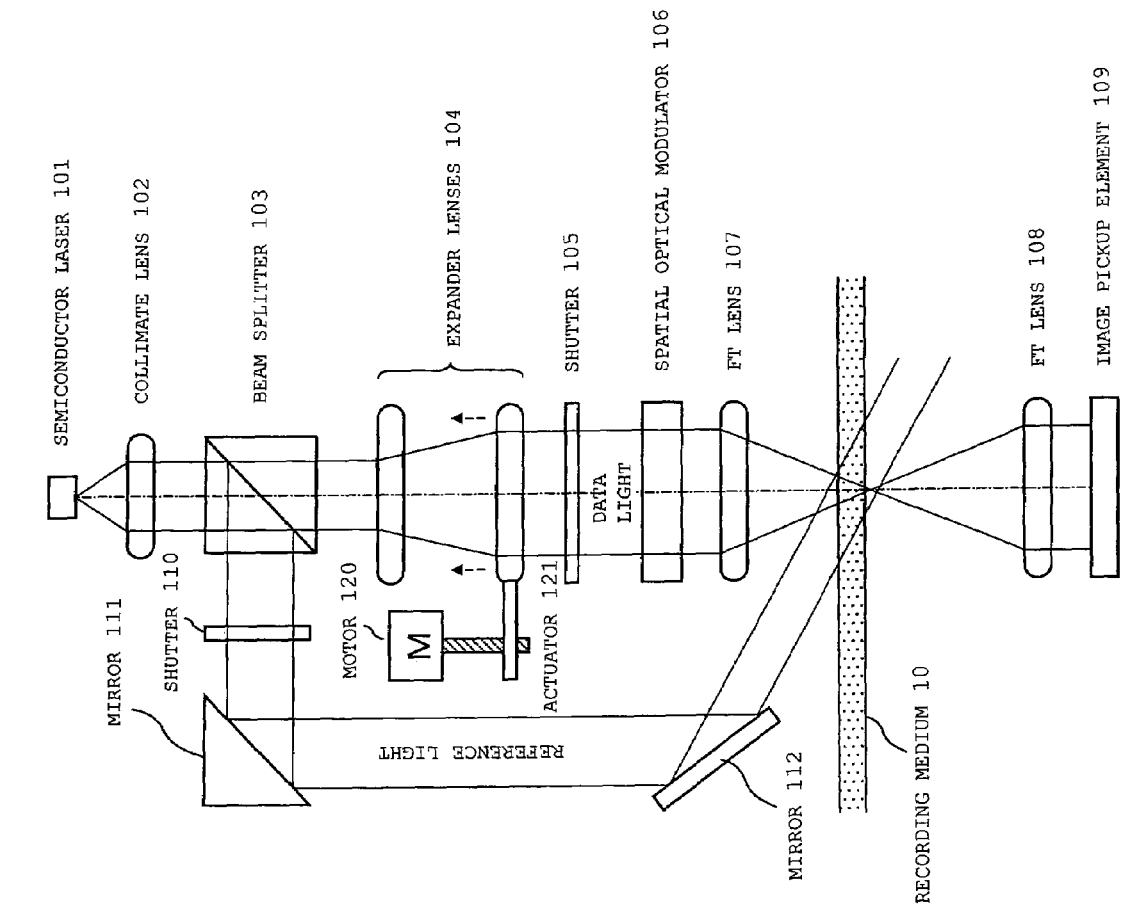
FIG. 2 is a diagram showing a construction of an optical head according to Embodiment 1 of the present invention.
Figure 3:
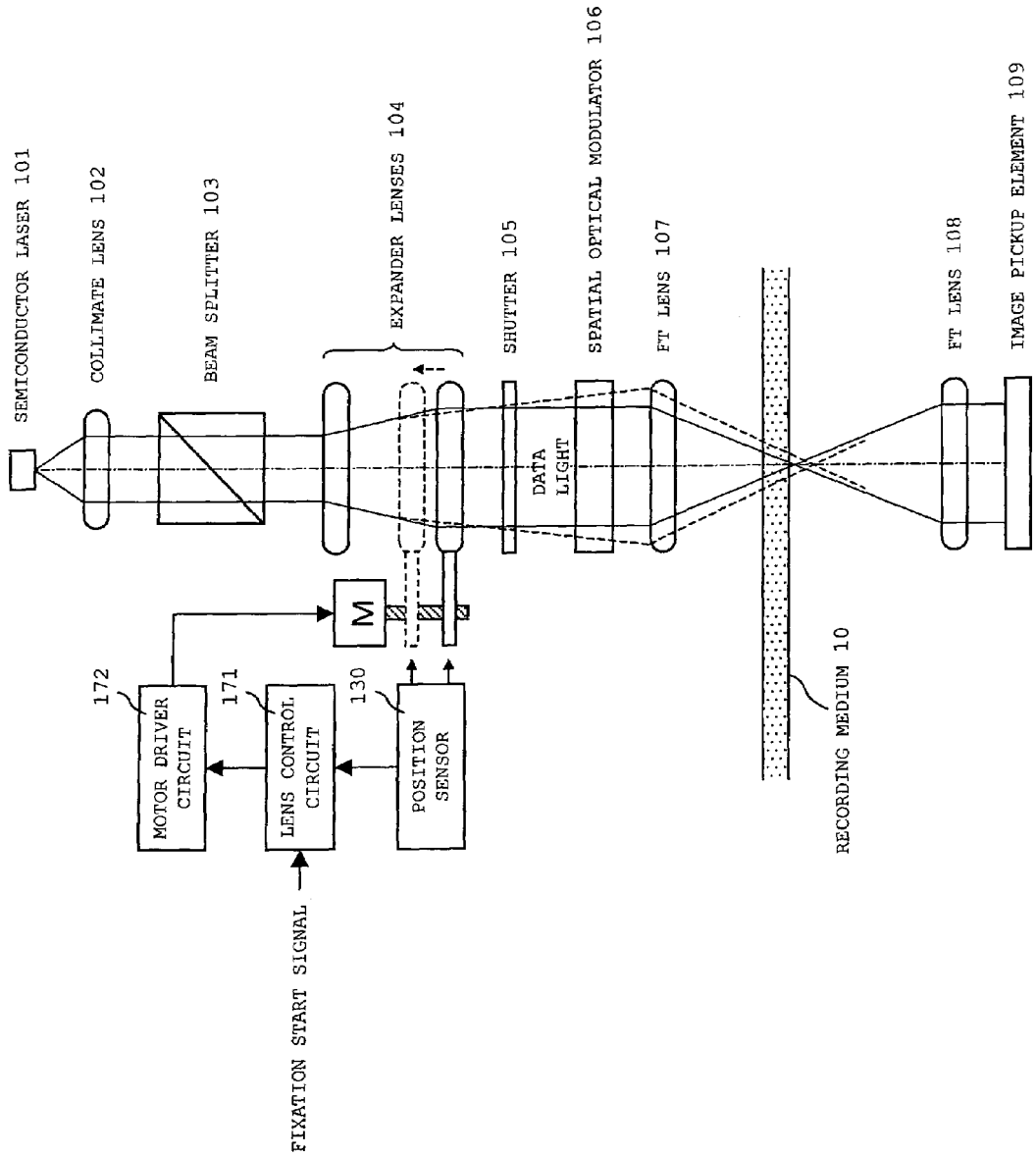
FIG. 3 is a diagram showing the construction of the optical head according to Embodiment 1 of the present invention.

FIGS. 2 and 3 show a construction of the optical head 13. A lens control circuit 171 and a motor driver circuit 172 shown in FIG. 3 are provided in the servo circuit 17. In FIG. 3, an optical path of the reference light and optical elements shown in FIG. 2 are omitted.

The optical head 13 includes a semiconductor laser 101, a collimate lens 102, a beam splitter 103, expander lenses 104, a shutter 105, a spatial optical modulator 106, FT lenses (Fourier transform lenses) 107 and 108, an image pick up element 109, a shutter 110, mirrors 111 and 112, a motor 120, an actuator 121, and a position sensor 130.

The semiconductor laser 101 emits laser light having a wavelength suited to the recording medium. The collimate lens 102 converts the laser light incoming from the semiconductor laser 101 into parallel light. The beam splitter 103 splits the laser light from the collimate lens 102 into the data light and the reference light.

The expander lenses 104 change a diffusion state of the laser light (parallel light) incoming from the beam splitter 103. The expander lenses 104 are composed of a stationary lens and a movable lens. Of those, the movable lens is displaced along an optical axis of the data light by the actuator 121.

The shutter 105 includes a mechanical shutter etc. and allows/disallows transmission of the data light according to a control signal. The spatial optical modulator 106 includes a liquid crystal panel etc., allows/disallows transmission of the light according to a recording signal, and subjects the data light to spatial optical modulation according to a recording signal.

The FT lens 107 converges the data light incoming from the spatial optical modulator 106 on a hologram material layer in the recording medium 10. The FT lens 108 converts into parallel light the reference light passing the recording medium, which has been interfered by the hologram material layer, and guides the light to the image pickup element 109. The image pickup element 109 is composed of a CCD (Charge Coupled Device) and outputs an electric signal according to an intensity distribution of the reference light received via the FT lens 108 to the signal amplifier circuit 15.

The shutter 110 includes a mechanical shutter etc. and allows/disallows transmission of the reference light according to a control signal. The mirrors 111 and 112 guide the reference light to data light irradiation position (recording area) on the hologram material layer. Of those, the mirror 112 is driven by driving means (not shown). Upon multi-angle recording, an incident angle of the reference light to the recording area is adjusted by driving the mirror 112.

The motor 120 is a driving source of the actuator 121. The actuator 121 displaces the movable lens of the expander lenses 104 along the optical axis of the data light by being driven by the motor 120.

The position sensor 130 detects a position of the movable lens of the expander lenses 104, specifically, detects whether the movable lens is at a position for information recording (image recording position) or a position for information fixation (fixing process position), and outputs the detection result to the lens control circuit 171.

The lens control circuit 171 outputs a driving signal to the motor driver circuit 172 by referencing a fixation start signal input from the controller 19 and a position detection signal input from the position sensor 130. The motor driver circuit 172 drives the motor 120 according to a signal from the lens control circuit 171.

Upon information recording, both the shutters 105 and 110 are OFF (light transmission). Upon information reproduction, the shutter 105 is ON (light interruption) and the shutter 110 is OFF (light transmission). Upon information fixation, the shutter 105 is OFF (light transmission) and the shutter 110 is ON (light interruption). The spatial optical modulator 106 is OFF upon information reproduction and information fixation, and data light subjected to no optical modulation is guided to the hologram material layer in the recording medium 10.

Upon image recording, after being converted into the parallel light by the collimate lens 102, the laser light emitted from the semiconductor laser 101 is split into the data light and the reference light by the beam splitter 103. Of those, after passing the expander lenses 104 and the shutter 105, the data light is modulated by the spatial optical modulator 106 and enters the FT lens 107. Then, the FT lens 107 converges the light to be applied to the hologram material layer of the recording medium.

Note that, upon image recording, the movable lens of the expander lenses 104 is located at a position for guiding the data light as the parallel light to the shutter 105 (image recording position: a position shown in FIG. 2).

On the other hand, after passing the shutter 110, the reference light split by the beam splitter 103 is reflected by the mirror 111, and further reflected by the mirror 112 at a predetermined angle according to the multi-angle recording. The reference light reflected by the mirror 112 is then guided to the data light irradiation position (recording area) on the hologram material layer.

When the data light and the reference light are guided to the recording area in this way, an interference fringe according to recording information is produced in the recording area, and monomers of a high refractive index are attracted to the interference fringe. After that, the fixation process described later is performed, whereby the monomers of a high refractive index are turned into polymers and a refractive index profile according to the interference fringe is held in the hologram material layer.

Upon information fixation, the laser light emitted from the semiconductor laser 101 is converted into the parallel light by the collimate lens 102 and then split into the data light and the reference light by the beam splitter 103. Of those, the reference light is interrupted by the shutter 110. On the other hand, the data light passes the expander lenses 104 and is guided to the shutter 105. At this time, the movable lens of the expander lenses 104 is located at a position for slightly diffusing the data light as compared with the parallel light (fixing process position: a position indicated by the dotted line in FIG. 3). Therefore, the data light is guided to the shutter 105 in a state of being converted into light slightly diffused as compared with the parallel light.

After passing the shutter 105, the data light is guided to the spatial optical modulator 106. At this time, the spatial optical modulator 106 is OFF, and the data light passes the spatial optical modulator 106 without being subjected to optical modulation. Then, the data light is converged on the hologram material layer in the recording medium 10 by the FT lens 107.

As described above, upon information fixation, the data light is converted into the state of being slightly diffused as compared with the parallel light by the expander lenses 104. For this reason, the hologram material layer in the recording medium 10 is irradiated with the data light in a region slightly more spacious than that upon information recording as indicated by the dotted line of FIG. 3. Accordingly, the monomers of a high refractive index are polymerized in a region slightly more spacious than the region irradiated with the data light and the reference light upon information recording. Thus, the recorded area is exhaustively subjected to fixation.

Upon information reproduction, after being converted into the parallel light by the collimate lens 102, the laser light emitted from the semiconductor laser 101 is split into the data light and the reference light by the beam splitter 103. Of those, the data light is interrupted by the shutter 105. On the other hand, the reference light passes the shutter 110 and then is applied to the hologram material layer (recording area) of the recording medium via the mirrors 111 and 112.

After that, the reference light is interfered by the interference fringe that is retained in the hologram material layer and passes the recording medium 10. Then, the reference light is guided on the image pickup element 109 via the FT lens 108.

The image pickup element 109 outputs an electric signal according to an intensity distribution of the received reflection light to the signal amplifier circuit 15. Here, the intensity distribution of the light received by the image pickup element 109 corresponds to the spatial optical modulation applied to the data light by the spatial optical modulator 106 upon recording. Accordingly, the electric signal output from the image pickup element 109 is processed by the signal amplifier circuit 15 and the decoder 16 and reproduction of the recorded area (page) concerned is performed.

Figure 4:
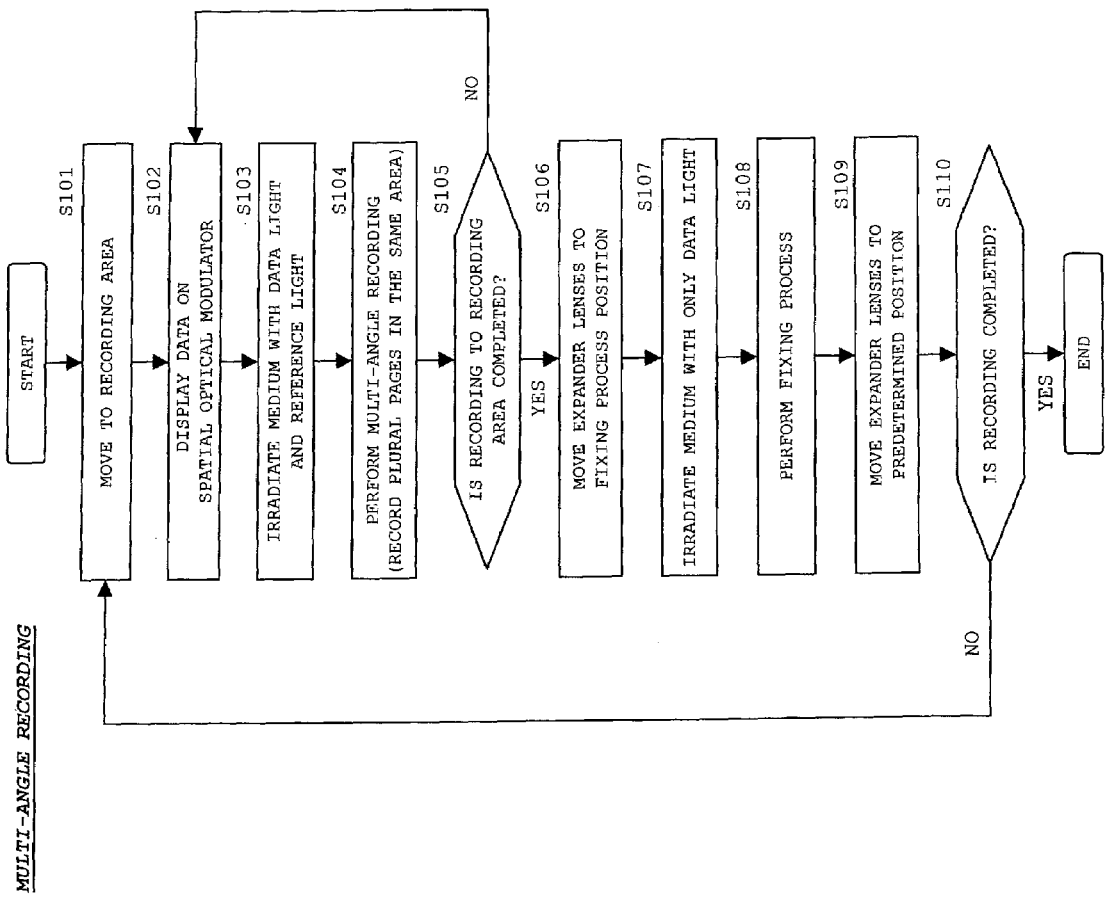
FIG. 4 is a flowchart of a process upon recording information and upon fixing information according to Embodiment 1 of the present invention.

FIG. 4 is a flow chart showing flows of the information recording process and the information fixing process in the case where information is recorded in a multi-angle manner.

When recording operation starts, first, the optical head 13 is moved to the recording area (S101). Then, after pixel display according to recording information is performed on the spatial optical modulator 106 (S102), the recording medium 10 is irradiated with the data light and the reference light (S103). At this time, an incident angle of the reference light to the recording area is set to an angle according to recording for the page concerned.

Once data is recorded for one page through irradiation of the data light and the reference light, next, it is judged whether the recording operation to this recording area is completed or not (S105). If the recording operation to this recording area is not completed, the process returns to S102 where recording for the next page is performed. At this time, the incident angle of the reference light to the recording area is set to an angle according to recording for the next page.

The operation from S102 to S104 will be repeated until the entire recording operation for the recording area concerned is completed. Then, when the entire recording operation for the recording area concerned is completed (S105:YES), the movable lens of the expander lenses 104 is moved to the fixing process position (S106), and then the recording medium 10 is irradiated only with the data light (S107). As a result, as described above, the fixing process for the recorded area is performed (S108).

After that, the movable lens of the expander lenses 104 is returned to the information recording position. Then, if the recording operation is not completed, the process returns to S101 where recording and fixation for the next recorded area are performed.

FIGS. 5A to 5D are views schematically showing the recording and fixing operations in FIG. 4.

When the recording operation starts, the recording area is irradiated with the data light and the reference light, and information for several pages is recorded on the recording area in the multi-angle manner (see FIG. 5A). After that, the reference light is OFF, and the recording area is irradiated with the data light slightly more spacious than that upon information recording (see FIG. 5B). In this way, when the fixation is completed for this recorded area, the optical head 13 is moved to the next recorded area, which is then irradiated with the data light and the reference light (see FIG. 5C). Accordingly, when the information for the several pages is recorded in the recording area in the multi-angle manner, the recorded area is irradiated with the data light slightly more spacious than that upon information recording, and the recorded area is subjected to fixation (see FIG. 5D).

[Embodiment 2]

While the case of recording information in the multi-angle manner has been described in Embodiment 1, the case of recording information in a multi-shift manner will be described in this embodiment. The constructions of the optical recording apparatus and the optical head are similar to those of the above embodiment. However, in this embodiment, the mirror 112 is stationary and reference light enters a recording area at a fixed angle. Also, the control process with the controller 19 is changed according to the change from the multi-angle manner to the multi-shift manner.

Figure 6:
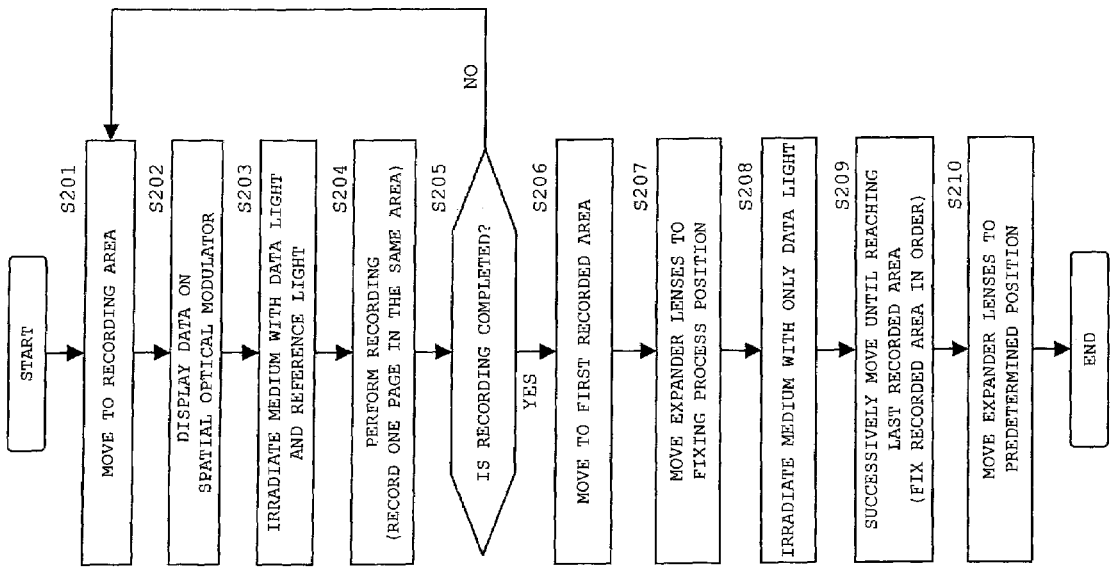
FIG. 6 is a flowchart of a process upon recording information and upon fixing information according to Embodiment 2 of the present invention.

FIG. 6 is a flow chart showing flows of the information recording process and the information fixing process in the case where information is recorded in a multi-shift manner.

When recording operation starts, first, the optical head 13 is moved to the recording area (S201). Then, after pixel display according to recording information is performed on the spatial optical modulator 106 (S202), the recording medium 10 is irradiated with the data light and the reference light (S203).

Once data is recorded for one page through irradiation of the data light and the reference light, next, it is judged whether the recording operation for all pages to be recorded in this recording operation is completed or not (S205). If the recording operation is not completed, the process returns to S201 where recording for the next page is performed. That is, the optical head 13 is moved to the next recording area, and the recording for the next page is performed at this position.

The operation from S201 to S204 will be repeated until the recording operation for all pages to be recorded is completed. Then, when the recording operation for all pages is completed (S205: YES), the optical head 13 is moved to the recorded area where the recording is performed first in this recording operation (S206). Then, after the movable lens of the expander lenses 104 is moved to the fixing process position (S207), the recording medium 10 is irradiated only with the data light (S208). As a result, the fixing process for the first recorded area is performed.

After that, the recording medium 10 is slowly fed by the stepping motor 18 and kept irradiated with fixing data light from the optical head 13. Thus, in this recording operation, application of the fixing data light is successively performed from the first recorded area to the last recorded area, whereby fixation is performed in order toward the last recorded area (S209). When fixation is performed on the last recorded area, the movable lens of the expander lenses 104 is returned to the information recording position (S210). As a result, the recording and fixing operations are completed.

FIGS. 7A to 7D are views schematically showing the recording and fixing operations in FIG. 6.

When the recording operation starts, the recording area is irradiated with the data light and the reference light, and information for one page is recorded on the recording area (see FIG. 7A). When the recording is completed for the recording area concerned, the stepping motor 18 feeds the recording medium 10 stepwise and the optical head 13 is moved to the next recording position. Then, recording is performed on this recording area (see FIG. 7B). The recording operation is executed until the recording operation for all pages to be recorded in this recording is completed.

When the recording for all pages is completed, the optical head 13 is moved to the first recorded area. Then, in the state where the reference light is OFF, the first recorded area is irradiated with the data light slightly more spacious than that upon information recording (see FIG. 7C). In this way, the fixation is completed for the first recorded area.

After that, while the application of the fixing data light is kept, the optical head 13 is slowly moved to the last recorded area. As a result, the recorded area fixation is performed in order toward the last recorded area (see FIG. 7D). Accordingly, when fixation is performed on the last recorded area, the data light is OFF, and the movable lens of the expander lenses 104 is returned to the information recording position.

[Embodiment 3]

According to this embodiment, a diffuser is disposed in an optical path of data light to thereby change a diffusion state of the data light. The constructions of the optical recording apparatus and the optical head are similar to those of Embodiments 1 and 2 above except the diffuser disposed. Either the process flow in the multi-angle manner (Embodiment 1) or the process flow in the multi-shift manner (Embodiment 2) is applicable to the process flow upon recording and fixation.

Figure 8:
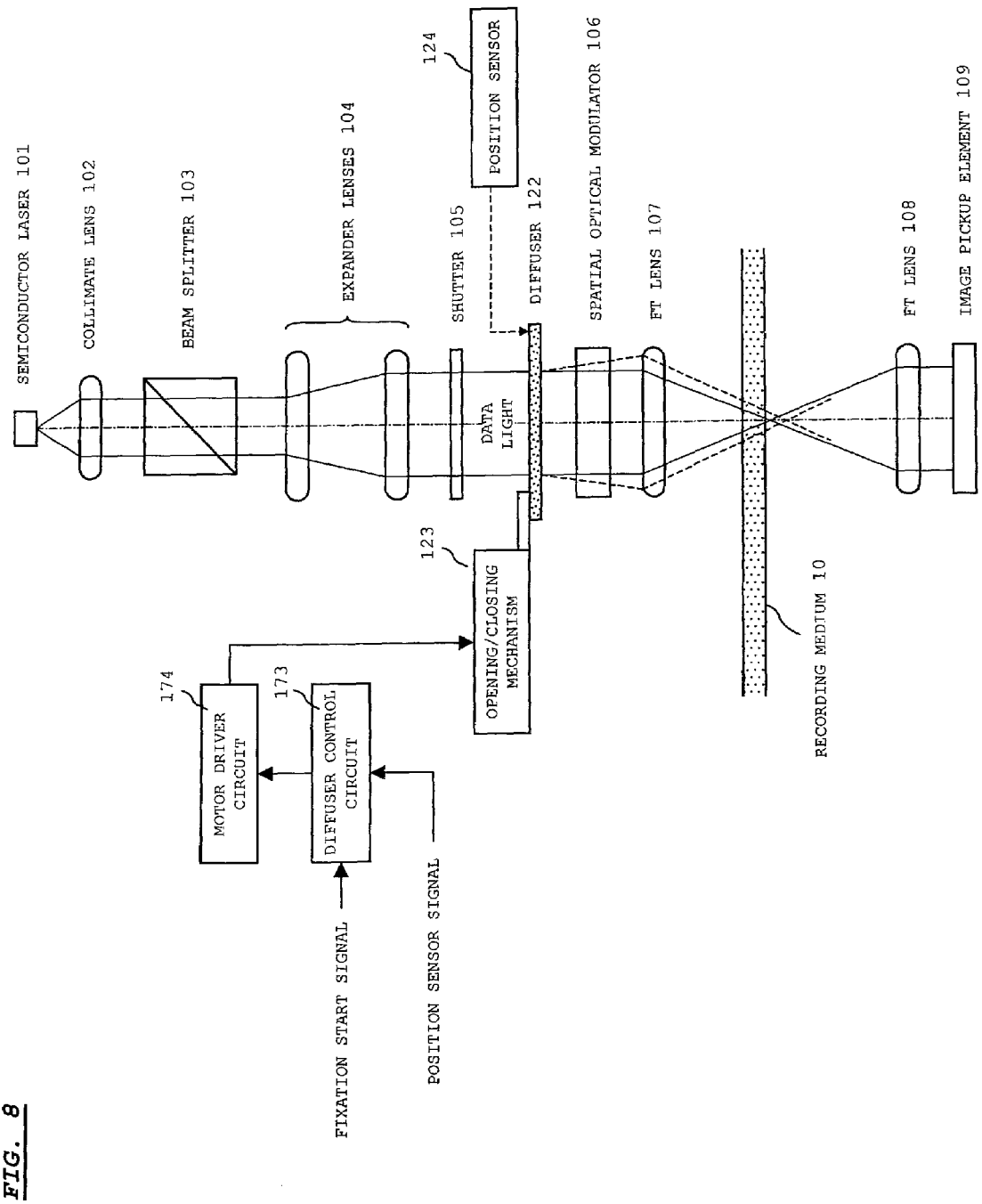
FIG. 8 is a diagram showing a construction of an optical head according to Embodiment 3 of the present invention.

FIG. 8 shows a construction of the optical head 13 according to this embodiment. In FIG. 8, an optical path of the reference light and optical elements are omitted. A diffuser control circuit 173 and a motor driver circuit 174 are provided in the servo circuit 17.

The diffuser 122 is composed of frosted glass, a holographic diffuser, etc., diffuses data light, and converts coherent data light (laser light) into incoherent data light.

An opening/closing mechanism 123 includes a motor as a driving source, and according to the motor driven by a motor driver circuit 174, the diffuser 122 is inserted to or removed from the optical path of the data light. A position sensor 124 detects a position of the diffuser 122, specifically, detects whether the diffuser 122 is at a position off the optical path of the data light (image recording position) or a position where the diffuser is in the optical path of the data light (fixing process position), and outputs the detection result to the diffuser control circuit 173.

The diffuser control circuit 173 outputs a driving signal to the motor driver circuit 174 by referencing a fixation start signal input from the controller 19 and a position detection signal input from the position sensor 124. The motor driver circuit 174 drives a motor in the opening/closing mechanism 123 according to the signal from the diffuser control circuit 173.

When the diffuser 122 is not inserted in the optical path of the data light, a converging state of the laser light with respect to the hologram material layer in the recording medium 10 is as indicated by the solid line of FIG. 8. On the other hand, when the diffuser 122 is inserted in the optical path of the data light, since the data light is diffused as compared with the parallel light by the diffuser 122, the converging state of the laser light is as indicated by the dotted line of FIG. 8.

The diffuser 122 is controlled by the diffuser control circuit 173 to be removed from the optical path of the data light upon information recording and to be inserted in the optical path of the data light upon information fixation. Accordingly, upon information fixation, a region slightly more spacious than that upon information recording is irradiated with the data light, whereby the recorded area fixation is reliably performed.

In addition, according to this embodiment, since the diffuser 122 converts the data light into the incoherent light, even if light interference occurs due to internal reflection in the recording medium or incidence of ambient light on the hologram material layer in the fixing process, the interference can be effectively suppressed. Therefore, the recorded area fixation can be appropriately performed as compared with Embodiments 1 and 2 above.

[Embodiment 4]

In Embodiment 2 described above, recording is performed on a plurality of recording areas in the multi-shift manner, and then the optical head returns to the initial position to perform fixation in order from the first recorded area toward the last recorded area. However, in this embodiment, without returning to the initial position, the optical head performs fixation in order from the last recorded area toward the first recorded area.

Figure 9:
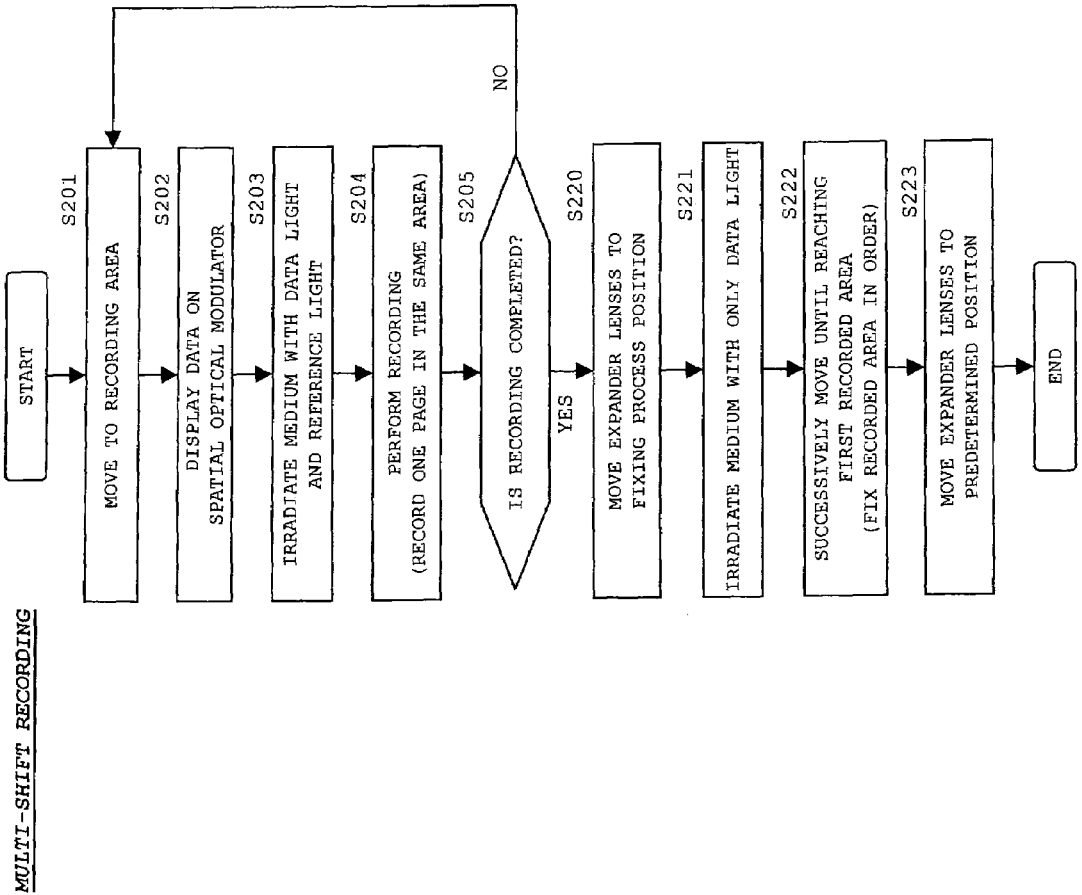
FIG. 9 is a flowchart of a process upon recording information and upon fixing information according to Embodiment 4 of the present invention.

FIG. 9 is a flow chart showing flows of the information recording process and information fixing process.

Note that the process from S201 to S205 is the same as the process steps of FIG. 6 according to Embodiment 2, and their description is omitted here. Used in the process flow shown in FIG. 9 is the construction example (Embodiment 1) where data light is diffused by the expander lenses 104. When the construction example (Embodiment 3) where data light is diffused by the diffuser 122 is used, in the process flow of FIG. 9, the step S220 is changed into "Move the diffuser 122 to a fixing process position (where the diffuser 122 is inserted in the optical path of data light)", and the step S223 is further changed into "Move the diffuser 122 to an information-recorded position (where the diffuser 122 is removed from the optical path of data light)".

The process from S201 to S204 is repeated to thereby complete the recording of all pages to be recorded in the current recording operation (S205: YES). Then, with the optical head 13 being held in the position (position in the last recorded area), the movable lens of the expander lenses 104 is moved to the fixing process position (S220). Then, the recording medium 10 is irradiated with only the data light (S221), and fixing process is performed on the last recorded area.

After that, while the stepping motor 18 is used to rotate the recording medium 10 backward at a low speed, the optical head 13 keeps irradiating the recording medium 10 with a fixing data light. Accordingly, the fixing data light is successively used for irradiation in order from the recorded area where recording was performed last in the current recording operation to the recorded area where recording was performed first in the current recording operation, and the respective recorded areas are fixed in order toward the first recorded area (S222). When the fixation is completed for the first recorded area, the movable lens of the expander lenses 104 is returned to the information-recorded position (S223). This ends the recording and fixing operations.

FIGS. 10A to 10D are views schematically showing the recording and fixing operations in FIG. 9.

When the recording operation starts, the recording area is irradiated with the data light and the reference light, and information for one page is recorded on the recording area (see FIG. 10A). When the recording is completed for the recording area concerned, the stepping motor 18 feeds the recording medium 10 stepwise, and the optical head 13 is moved to the next recording position. Then, the recording is performed in this recording position (see FIG. 10B). The recording operation is executed until the recording operation for all pages to be recorded in this recording is completed.

When the recording for all pages is completed, the reference light is OFF with the optical head 13 being held in the last recorded position, and the last recorded area is irradiated with the data light slightly more spacious than that upon information recording (see FIG. 10C). In this way, the fixation is completed for the last recorded area.

After that, while the application of the data light for fixation is kept, the optical head 13 is slowly moved to the first recorded area. As a result, the recorded area fixation is performed in order toward the first recorded area (see FIG. 10D). Accordingly, when fixation is performed on the last recorded area, the data light is OFF, and the movable lens of the expander lenses 104 is returned to the information recording position.

[Embodiment 5]

In Embodiment 3, after the diffuser 122 converts the coherent data light into the incoherent data light, the hologram material layer is irradiated with the data light to perform fixation of the recording area. In this case, the hologram material layer is irradiated with the spatially incoherent data light.

On the other hand, in this embodiment, the hologram material layer is irradiated with the data light while the incoherent state of the data light is temporally changed to fix the information. According to this embodiment, by thus temporally changing the incoherent state of the data light, even if light interference occurs due to internal reflection in the recording medium, etc., the interference state can be changed over time. At this time, interference fringes formed by the interference change into the following state before being fixed onto the hologram material layer. Thus, according to the present invention, the fixation of the unnecessary pattern (noise) on the hologram material layer by the interference can be prevented, whereby the appropriate fixing process can be achieved.

Here, for example, the following method can be adopted as a method of temporally changing the coherent state of the data light.

(1) The data light and the recording medium 10 are relatively reciprocated (oscillated) in a direction of an optical axis of the data light or a direction perpendicular thereto.

(2) A drive current of the semiconductor laser 101 is periodically changed.

(3) A temperature of the semiconductor laser 101 is periodically changed.

Among the above, the method (1) can be realized by the following method, for example.

(a) A lens system such as the expander lenses 104 or the FT lenses 107 is reciprocated (oscillated) in the direction of the data light optical axis or the direction perpendicular thereto.

(b) The diffuser 122 is reciprocated (oscillated) in the direction of the data light optical axis or the direction perpendicular thereto.

(c) The recording medium 10 is jogged in its rotating direction and its counter rotating direction at a constant frequency.

(d) The optical head 13 is reciprocated (oscillated) in a radial direction of the recording medium 10 at a constant frequency.

In the methods (a) to (d), the reciprocating frequency is set while considering the light amount (laser intensity), the recording medium sensitivity, and the remaining amount of monomers in information fixing process. Note that the frequency can be usually set to about 10 Hz. Further, the distance for the reciprocation is set to such a distance that, even when the light interference occurs in the hologram material layer due to internal reflection etc., its interference state changes from one state to a different state along with the reciprocation of the data light.

According to the method (a), in the constructions shown in FIGS. 2 and 3, for example, the movable lens of the expander lenses 104 along the optical axis of the data light is reciprocated (oscillated) in the direction of the data light optical axis by the actuator 121 at a constant frequency.

The method (a) may also be realized by reciprocating the FT lenses 107 in the direction of the data light optical axis or the direction perpendicular thereto. However, in this case, in addition to the constructions shown in FIGS. 2 and 3, an actuator for driving the FT lenses 107 is necessary. This actuator can be composed, for example, of an electromagnetic drive actuator using a coil and a magnet. In addition, an actuator using a piezoelectric element as a drive source can be used.

In the construction shown in FIG. 8, the method (b) may be realized by driving the diffuser 122 to be reciprocated (oscillated) in the direction perpendicular to the data light optical axis by the opening/closing mechanism 123 at a constant frequency.

The method (b) may also be realized by arranging between the opening/closing mechanism 123 and the diffuser 122 an actuator for driving the diffuser 122 to be reciprocated (oscillated) in the direction of data light optical axis or the direction perpendicular thereto. In this case, the diffuser 122 is driven in the direction of the data light optical axis or the direction perpendicular thereto. The actuator can be composed, similarly to the above, of an electromagnetic drive actuator or an actuator using a piezoelectric element can be used.

In the construction shown in FIG. 1, for example, the method (c) may be realized by jogging the recording medium 10 (disk) in its rotating direction and its counter rotating direction by the stepping motor 18 at a constant frequency.

In the construction shown in FIG. 1, for example, the method (d) may be realized by reciprocating the optical head 13 in the radius direction of the recording medium 10 (disk) by its feed mechanism at a constant frequency.

Note that in the construction shown in FIG. 1, the method (2) may be realized by periodically changing a current applied to the semiconductor laser 101 from the laser driver circuit 14. Since the recording medium 10 of this embodiment has high wavelength-dependency in the hologram material layer, a semiconductor laser with an external cavity is usually used as the semiconductor laser 101. When the inventors of the present invention made experiments using the semiconductor laser with the external cavity, it was confirmed that characteristics of the laser light changed between the coherent state and the incoherent state by changing the drive current for the semiconductor laser by about 0.2 mW. Therefore, the coherent state of the data light can be temporally changed by changing the drive current applied to the semiconductor laser 101 from the laser driver circuit 14 at a frequency of about 10 Hz.

Note that according to the inventors' experiments, it was confirmed that the characteristics of the laser light could be changed between the coherent state and the incoherent state also by changing the temperature of the semiconductor laser (temperature of a casing to which CAN is mounted) by about 0.5° C. Accordingly, instead of using the method of thus changing the drive current for the semiconductor laser, the coherent state of the data light can also be changed by changing the temperature of the semiconductor laser periodically, for example, at a frequency of about 10 Hz as shown in the method (3). In this case, an additional construction for changing the temperature of the semiconductor laser is necessary. Such a construction may be used that a Peltier element for cooling and a temperature sensor are provided to the casing to which CAN is mounted, and the Peltier element is driven and controlled based on a temperature detected by the temperature sensor. Note that the inventors' experiments used this construction.

FIGS. 11A to 11F schematically show data light irradiation states when applying the methods (a) to (d).

FIG. 11A shows an irradiation state when the lens system is reciprocated (oscillated) in the direction of the data light optical axis. In this case, the data light irradiation area repeatedly displaces along with the reciprocation of the lens system in the optical axis direction between the irradiation area (recording area) in the information recording and a slightly more spacious irradiation area. Note that the irradiation state is realized by repeatedly displacing the movable lens of the expander lenses 104 in the construction of FIG. 3 between a position indicated by a solid line and a position indicated by a dotted line.

FIG. 11B shows an irradiation state when the lens system is reciprocated (oscillated) in the direction perpendicular to the data light optical axis. In this case, the recording medium is irradiated with the data light slightly wider than in the information recording. Also, the data light is repeatedly displaced in the direction perpendicular to the optical axis along with the lens system reciprocation. At this time, the data light displacement stroke is set so that when the data light displaces in this displacement stroke at any displacement position, the irradiation (recording area) area in the information recording always falls within its irradiation area. Note that this irradiation area is realized in the construction of FIG. 3, for example, when the FT lenses 107 are repeatedly displaced in the direction perpendicular to the data light optical axis while the movable lens of the expander lenses 104 is placed at the dotted line area. In this case, an actuator for displacing the FT lens 107 in the direction perpendicular to the data light optical axis is arranged.

FIG. 11C shows an irradiation state when the diffuser 122 is reciprocated (oscillated) in the direction of the data light optical axis. In this case, along with the reciprocation of the diffuser 122, the irradiation area of the data light is repeatedly displaced in the direction of the optical axis between the irradiation area (recording area) in the information recording and a slightly more spacious irradiation area. Note that this irradiation state is realized by repeatedly displacing the diffuser 122 in the construction of FIG. 8, for example, between the position of the drawing and a position closer to the spatial optical modulator 106 side by a predetermined distance therefrom. In this case, an actuator for displacing the diffuser 122 in the direction of the data light optical axis is arranged between the opening/closing mechanism 123 and the diffuser 122. Note that the irradiation state of FIG. 11C can also be realized by repeatedly displacing the FT lenses 107 in the direction of the data light optical axis while the diffuser 122 is placed at the position shown in FIG. 8.

FIG. 11D shows an irradiation state when the diffuser 122 is reciprocated (oscillated) in the direction perpendicular to the data light optical axis. In this case, the recording medium is irradiated with the data light slightly more spacious than that upon information recording. In this case, along with the reciprocation of the diffuser 122, the data light is repeatedly displaced in the direction perpendicular to the data light optical axis. At this time, the data light displacement stroke is set so that when the data light displaces in this displacement stroke at any displacement position, the irradiation area (recording area) in the information recording always falls within its irradiation area. Note that this irradiation state is realized in the construction of FIG. 8, for example, when the diffuser 122 is repeatedly displaced by the opening/closing mechanism 123 in the direction perpendicular to the data light optical axis from the position of FIG. 8. Note that this irradiation state of FIG. 11D can be also realized by repeatedly displacing the FT lenses 107 in the direction perpendicular to the data light optical axis while the diffuser 122 is placed at the position shown in FIG. 8.

FIG. 11E shows an irradiation state when the recording medium 10 is reciprocated (oscillated) in its rotating direction and its counter rotating direction. In this case, the recording medium is irradiated with the data light slightly more spacious than that upon information recording. Also, along with the reciprocation of the recording medium 10, the data light is relatively displaced in the direction perpendicular to the data light optical axis. At this time, the recording medium displacement stroke is set so that when the recording medium 10 displaces in this displacement stroke at any displacement position, the irradiation area (recording area) in the information recording always falls within the irradiation area of the data light. Note that this irradiation state is realized in the construction of FIG. 3, for example, when the recording medium 10 is jogged in its rotating direction and its counter rotating direction while the movable lens of the expander lenses 104 is placed at the position indicated by the dotted line. Alternatively, this irradiation state is realized in the construction of FIG. 8 when the recording medium 10 is repeatedly jogged in its rotating direction and its counter rotating direction while the diffuser 122 is inserted in the data light optical path.

FIG. 11F shows an irradiation state when the optical head 13 is reciprocated (oscillated) in the radius direction of the recording medium 10. In this case, the recording medium is irradiated with the data light slightly more spacious than that upon information recording. Also, along with the reciprocation of the optical head 13, the data light is displaced in the direction perpendicular to the data light optical axis. At this time, the displacement stroke of the optical head 13 is set so that when the optical head 13 displaces in this displacement stroke at any displacement position, the irradiation area (recording area) in the information recording always falls within its irradiation area. Note that this irradiation state is realized in the construction of FIG. 3, for example, when the optical head 13 is repeatedly displaced while the movable lens of the expander lenses 104 is placed at the position indicated by the dotted line. Alternatively, this irradiation state is realized in the construction of FIG. 8 when the optical head 13 is repeatedly displaced while the diffuser 122 is inserted in the data light optical path.

When applying the methods (2) and (3), as shown in FIG. 5B, a drive current or a temperature of the semiconductor laser 101 is periodically changed while the recording area is irradiated with the data light slightly more spacious than that upon information recording. This irradiation state is realized in the construction of FIG. 3, for example, when the drive current or the temperature of the semiconductor laser 101 is periodically changed while the movable lens of the expander lenses 104 is placed at the dotted line area. Alternatively, this irradiation state is realized in the construction of FIG. 8 when the drive current or the temperature of the semiconductor laser 101 is periodically changed while the diffuser 122 is inserted in the data light optical path.

Note that when successively performing the fixing process on the plural recording areas as shown in FIGS. 7A to 7D and FIGS. 10A to 10D, the processes shown in FIGS. 11A to 11F are performed to each of the recording areas. That is, the data light is reciprocated (oscillated) in one recording area in the direction of the data light optical axis or the direction perpendicular thereto to fix information. When the fixation is finished, the radiation position is moved to the next recording area (skipping operation), and the data light is reciprocated (oscillated) in this recording area in the direction of the data light optical axis or the direction perpendicular thereto to fix information. This fixing process and the skipping operation are successively performed on a series of recording areas to perform image fixation on those recording areas.

Similarly, when the processes of FIGS. 7A to 7D and FIGS. 10A to 10D are performed while the drive current or the temperature of the semiconductor laser 101 is periodically changed, the recording areas are skipped in order, and the fixation process is performed while the drive current or the temperature of the semiconductor laser 101 is periodically changed.

Although the embodiments according to the present invention have been described above, the invention is not limited to those embodiments.

For example, the expander lenses 104 are or the diffuser 122 is used as the optical element to change the incident area where the data light enters the hologram material layer. However, optical elements other than the above may also be used to change the incident area for the data light.

Further, according to the above embodiments, the present invention is applied to the optical recording apparatus for performing recording/reproducing on a light-transmission recording medium, but is applicable to an optical recording apparatus for performing recording/reproducing on a light-reflex recording medium as well.

Furthermore, according to the above embodiments, the flow charts of FIGS. 6 and 9 are shown as the operation flows relating to the multi-shift recording. However, the process of successively fixing a plurality of recorded areas may also be used for fixing information recorded in the multi-angle manner. In this case, after information is recorded in the plurality of recording areas in the multi-angle manner, the recorded areas are all fixed by being successively irradiated in order from the first recorded area toward the last recorded area or from the last recorded area toward the first recorded area.

According to the embodiments of the present invention and other embodiments, various modifications can be made appropriately within a scope of claims without departing from the technical idea.

What is claimed is:

1. An optical recording apparatus for recording information by causing data light and reference light to interfere with each other inside a hologram material layer, characterized by comprising:
   means for providing data light and reference light for recording information inside the hologram material layer;
   an optical element for changing a range of irradiation to the hologram material layer with the data light;
   means for suspending the irradiation to the hologram material layer with the reference light for the fixing of the information;
   a driving unit for driving the optical element; and
   a control unit for controlling the driving unit such that the range of irradiation to the hologram material layer with the data light is wider during fixing the information than the range during recording the information.

2. The optical recording apparatus according to claim 1, characterized in that the optical element comprises an expander lens that is driven by the driving unit to change a diffusion state of the data light.

3. The optical recording apparatus according to claim 1, characterized in that the optical element comprises a diffuser that is driven by the driving unit to change a diffusion state of the data light and a coherent state.

4. The optical recording apparatus according to any one of claims 1 to 3, characterized in that the control unit controls the driving unit such that the range of irradiation to the hologram material layer with the data light is switched from the range in recording the information to the range in fixing the information upon completion of information recording for one recording area.

5. The optical recording apparatus according to any one of claims 1 to 3, characterized in that the control unit controls the driving unit such that the range of irradiation to the hologram material layer with the data light is switched from the range in recording the information to the range in fixing the information along with shift in irradiation position of the data light to a recording area where information recording starts out of a plurality of recording areas that have been subjected to the information recording in succession.

6. The optical recording apparatus according to claim 5, characterized in that the data light is applied with the range of irradiation to the hologram material layer being set to the range in fixing the information while successively shifting its irradiation position from the recording area where the information recording starts toward a recording area where the information recording ends.

7. The optical recording apparatus according to any one of claims 1 to 3, characterized in that the control unit controls the driving unit such that the range of irradiation to the hologram material layer with the data light is switched from the range in recording the information to the range in fixing the information upon completion of information recording for a recording area where information recording ends out of a plurality of recording areas that have been subjected to the information recording in succession.

8. The optical recording apparatus according to claim 7, characterized in that the data light is applied with the range of irradiation to the hologram material layer being set to the range in fixing the information while successively shifting its irradiation position from the recording area where the information recording ends toward a recording area where the information recording starts.

9. The optical recording apparatus according to any one of claims 1 to 3, characterized by further comprising means for temporally changing the coherent state of the data light in the hologram material layer in fixing the information.

10. The optical recording apparatus according to claim 9, characterized in that the means for temporally changing the coherent state of the data light comprises means for repeatedly displacing the data light in a direction of an optical axis of the data light or a direction perpendicular to the optical axis in fixing the information.

11. The optical recording apparatus according to claim 9, characterized in that the means for temporally changing the coherent state of the data light comprises means for periodically changing a drive current of a semiconductor laser for emitting the laser beam in fixing the information.

12. The optical recording apparatus according to claim 9, characterized in that the means for temporally changing the coherent state of the data light comprises means for periodically changing a temperature of a semiconductor laser for emitting the laser beam in fixing the information.

13. An optical head for irradiating a hologram material layer with data light and reference light to recording information, characterized by comprising:
   means for providing data light and reference light for recording information inside the hologram material layer;
   an optical element inserted in an optical path for the data light and adapted to change a range of irradiation to the hologram material layer with the data light;
   means for suspending the irradiation to the hologram material layer with the reference light for the fixing of the information; and
   driving unit for driving the optical element to set the optical element to (1) a first position for recording information in the hologram material layer and (2) a second position for fixing the recorded information, in order to change the range of irradiation to the hologram material layer.

14. The optical head according to claim 13, characterized in that the optical element comprises an expander lens that is driven by the driving unit to change a diffusion state of the data light.

15. The optical head according to claim 13, characterized in that the optical element comprises a diffuser that is driven by the driving unit to change a diffusion state of the data light and a coherent state.

* * * * *